US012561786B2

(12) United States Patent
Tan et al.

(10) Patent No.: US 12,561,786 B2
(45) Date of Patent: Feb. 24, 2026

(54) GREEN COFFEE BEAN IDENTIFICATION METHOD AND GREEN COFFEE BEAN IDENTIFICATION SYSTEM

(71) Applicant: National Tsing Hua University, Hsinchu (TW)

(72) Inventors: Shu-Min Tan, Hsinchu (TW); Shih-Hsun Hung, Hsinchu (TW); Chih-Chiang Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 446 days.

(21) Appl. No.: 18/304,349

(22) Filed: Apr. 21, 2023

(65) Prior Publication Data

US 2024/0265517 A1 Aug. 8, 2024

(30) Foreign Application Priority Data

Feb. 8, 2023 (TW) ................................. 112104417

(51) Int. Cl.
*G06T 7/00* (2017.01)
*G06T 7/90* (2017.01)
(Continued)

(52) U.S. Cl.
CPC .............. *G06T 7/0004* (2013.01); *G06T 7/90* (2017.01); *G06V 20/68* (2022.01);
(Continued)

(58) Field of Classification Search
None
See application file for complete search history.

(56) References Cited

U.S. PATENT DOCUMENTS 10,849,352 B2 12/2020 Chen et al.
2014/0282198 A1 9/2014 Mayworm
(Continued)

FOREIGN PATENT DOCUMENTS

CN 109261527 1/2019
CN 113828520 12/2021
(Continued)

OTHER PUBLICATIONS

Portugal-Zambrano, Christian E., et al. "Computer vision grading system for physical quality evaluation of green coffee beans." 2016 XLII Latin American Computing Conference (CLEI). IEEE, 2016 (machine translation). (Year: 2016).*
(Continued)

*Primary Examiner* — Sean M Conner
(74) *Attorney, Agent, or Firm* — JCIPRNET

(57) ABSTRACT

A green coffee bean identification method includes obtaining an image of a green coffee bean by an image capture device, wherein the image includes pixels; reading an average value weight, a standard deviation weight, and a threshold value corresponding to the origin or the variety of green coffee beans from a memory; extracting three primary color grayscale values for each pixel from the image; calculating the average values and the standard deviations corresponding to the green coffee bean according to the approximate normal distributions of the three primary color grayscale value distributions; and respectively multiplying the average value and the standard deviation by the average value weight and the standard deviation weight to be then added together to calculate the total scoring value, wherein when the total scoring value is less than (respectively larger than) the threshold value, the green coffee bean is identified as a qualified (respectively defective) bean.

16 Claims, 13 Drawing Sheets

(51) Int. Cl.
  *G06V 20/68* (2022.01)
  *G06V 10/774* (2022.01)
(52) U.S. Cl.
  CPC ............... *G06T 2207/10024* (2013.01); *G06T 2207/20081* (2013.01); *G06T 2207/30128* (2013.01); *G06V 10/774* (2022.01)

(56) References Cited

U.S. PATENT DOCUMENTS

| | | | |
|---|---|---|---|
| 2016/0120211 A1 | 5/2016 | Wilson et al. | |
| 2019/0142053 A1 | 5/2019 | Tun et al. | |
| 2023/0334652 A1* | 10/2023 | Siegrist | ..................... G06T 7/11 |

FOREIGN PATENT DOCUMENTS

| | | |
|---|---|---|
| CN | 114982846 | 9/2022 |
| TW | M596343 | 6/2020 |
| TW | 202116427 | 5/2021 |
| TW | M624851 | 3/2022 |

OTHER PUBLICATIONS

"Office Action of Taiwan Counterpart Application", issued on Jun. 20, 2023, p. 1-p. 5.

Kun-Yang Chen, Abstract of "A Study on Defect Detection for Green Coffee Beans with Machine Vision", Thesis of Master degree of Department of Bio-Industrial Mechatronics Engineering, National Chung Hsing University, Jun. 2016. pp. 1-2.

Jo-An Piao, Abstract of "Development of Auto-Sorting Device for Green Coffee Bean Defects with Machine Vision", Thesis of Master degree of Department of Bio-Industrial Mechatronics Engineering, National Chung Hsing University, Nov. 2018, pp. 1-2.

Mauricio García et al., "Quality and Defect Inspection of Green Coffee Beans Using a Computer Vision System", Appl. Sci., Oct. 8, 2019, pp. 1-19.

Shih-Yu Chen et al., "Real-time defect inspection of green coffee beans using NIR snapshot hyperspectral imaging", Computers and Electronics in Agriculture, Jun. 2022, pp. 1-14.

Edwin R. Arboleda et al., "An Image Processing Technique for Coffee Black Beans Identification", 2018 IEEE International Conference on Innovative Research and Development (ICIRD), May 11-12, 2018, pp. 1-5.

Christian E. Portugal-Zambrano et al., "Computer vision grading system for physical quality evaluation of green coffee beans", 2016 IEEE XLII Latin American Computing Conference (CLEI), Oct. 10-14, 2016, pp. 1-11.

* cited by examiner

2

2a

<u>7</u>

8

GREEN COFFEE BEAN IDENTIFICATION METHOD AND GREEN COFFEE BEAN IDENTIFICATION SYSTEM

CROSS-REFERENCE TO RELATED APPLICATION

This application claims the priority benefit of Taiwan application serial no. 112104417, filed on Feb. 8, 2023. The entirety of the above-mentioned patent application is hereby incorporated by reference herein and made a part of this specification.

BACKGROUND

Technical Field

The disclosure relates to an identification technology, and in particular to a green coffee bean identification method and a green coffee bean identification system.

Description of Related Art

The coffee bean is the second major agricultural product in the commodity market, so selecting a high-quality green coffee bean is a very important technology. However, the current selection method of the green coffee bean mainly depends on manual selection, which is very time-consuming and inefficient. On the other hand, the current algorithm for selecting the green coffee bean by a machine relies on a large amount of calculations. Although the accuracy is high, the algorithm is time-consuming and the required costs of the machine are also high, so it is difficult to popularize the machine to small farmers or small production teams.

In addition, in the current green coffee bean identification technology, there is no solution for identifying the green coffee bean based on inherent biological characteristics of the seed coat color of the green coffee bean. Therefore, even to identify the green coffee bean according to an image of the green coffee bean, it is necessary to preprocess the image of the green coffee bean to generate a large amount of data and perform complex calculations, which are very time-consuming. Therefore, how to efficiently and cost-effectively identify the green coffee bean and to distinguish a qualified bean from a defective bean is an urgent research goal.

SUMMARY

The disclosure provides a green coffee bean identification system, which includes an image capture device, a memory, and a processor. The image capture device is configured to obtain an image of a green coffee bean. The image includes multiple pixels. The memory is configured to store a first average value weight, a first standard deviation weight, and a first threshold value corresponding to the green coffee bean. The processor is coupled to the image capture device and the memory, and is configured to execute the following steps. The image is received, and the first average value weight, the first standard deviation weight, and the first threshold value are read. A first color grayscale value of each of the pixels is extracted from the image. A first average value and a first standard deviation corresponding to the green coffee bean are calculated according to an approximate normal distribution of the first color grayscale values. The first average value and the first standard deviation are respectively multiplied by the first average value weight and the first standard deviation weight to be then added together to calculate a first scoring value. When the first scoring value is less than the first threshold value, the processor identifies the green coffee bean as a qualified bean.

In an embodiment, when the first scoring value is greater than the first threshold value, the processor identifies the green coffee bean as a defective bean.

In an embodiment, the memory is further configured to store a second average value weight, a third average value weight, a second standard deviation weight, a third standard deviation weight, and a second threshold value corresponding to the green coffee bean. The processor is further configured to execute the following steps. The second average value weight, the third average value weight, the second standard deviation weight, the third standard deviation weight, and the second threshold value are read. A second color grayscale value and a third color grayscale value of each of the pixels are extracted from the image. A second average value and a second standard deviation corresponding to the green coffee bean are calculated according to an approximate normal distribution of the second color grayscale values. A third average value and a third standard deviation corresponding to the green coffee bean are calculated according to an approximate normal distribution of the third color grayscale values. The second average value and the second standard deviation are respectively multiplied by the second average value weight and the second standard deviation weight to be then added together to calculate a second scoring value. The third average value and the third standard deviation are respectively multiplied by the third average value weight and the third standard deviation weight to be then added together to calculate a third scoring value. When the sum of the first scoring value, the second scoring value, and the third scoring value is less than or equal to the second threshold value, the processor identifies the green coffee bean as a qualified bean.

In an embodiment, when the sum of the first scoring value, the second scoring value, and the third scoring value is greater than the second threshold value, the processor identifies the green coffee bean as a defective bean.

In an embodiment, the first average value weight, the second average value weight, the third average value weight, the first standard deviation weight, the second standard deviation weight, the third standard deviation weight, the first threshold value, and the second threshold value depend on the growth location or the variety of coffee beans.

In an embodiment, the first average value weight, the second average value weight, the third average value weight, the first standard deviation weight, the second standard deviation weight, the third standard deviation weight, the first threshold value, and the second threshold value are obtained through a machine learning algorithm with a training set of green coffee beans. The green coffee beans for training are from the same origin or of the same variety.

The disclosure provides a green coffee bean identification method, which is suitable for a green coffee bean identification device with an image capture device and a memory. The green coffee bean identification method includes the following steps. An image of a green coffee bean is obtained through the image capture device. The image includes multiple pixels. A first average value weight, a first standard deviation weight, and a first threshold value corresponding to the green coffee bean stored in the memory are read. A first color grayscale value of each of the pixels is extracted from the image. A first average value and a first standard deviation corresponding to the green coffee bean are calculated according to an approximate normal distribution of the first color grayscale values. The first average value and the first standard deviation are respectively multiplied by the first average value weight and the first standard deviation weight to be then added together to calculate a first scoring value. When the first scoring value is less than or equal to the first threshold value, the green coffee bean is identified as a qualified bean.

In an embodiment, when the first scoring value is greater than the first threshold value, the green coffee bean is identified as a defective bean.

In an embodiment, the green coffee bean identification method further includes the following steps. A second average value weight, a third average value weight, a second standard deviation weight, a third standard deviation weight, and a second threshold value are read. A second color grayscale value and a third color grayscale value of each of the pixels are extracted from the image. A second average value and a second standard deviation corresponding to the green coffee bean are calculated according to an approximate normal distribution of the second color grayscale values. A third average value and a third standard deviation corresponding to the green coffee bean are calculated according to an approximate normal distribution of the third color grayscale values. The second average value and the second standard deviation are respectively multiplied by the second average value weight and the second standard deviation weight to be then added together to calculate a second scoring value. The third average value and the third standard deviation are respectively multiplied by the third average value weight and the third standard deviation weight to be then added together to calculate a third scoring value. When the sum of the first scoring value, the second scoring value, and the third scoring value is less than or equal to the second threshold value, the processor identifies the green coffee bean as a qualified bean.

In an embodiment, when the sum of the first scoring value, the second scoring value, and the third scoring value is greater than the second threshold value, the green coffee bean is identified as a defective bean.

In an embodiment, the first average value weight, the second average value weight, the third average value weight, the first standard deviation weight, the second standard deviation weight, the third standard deviation weight, the first threshold value, and the second threshold value depend on the growth location or the variety of coffee beans.

In an embodiment, the first average value weight, the second average value weight, the third average value weight, the first standard deviation weight, the second standard deviation weight, the third standard deviation weight, the first threshold value, and the second threshold value are obtained through a machine learning algorithm with a training set of green coffee beans. The green coffee beans for training are from the same origin or of the same variety.

Based on the above, the green coffee bean identification system and the green coffee bean identification method described in the embodiments of the disclosure can perform identification with the low-resolution image of the green coffee bean, so identification may be performed in conjunction with low-cost Raspberry Pi and Arduino hardware architectures. In addition, the disclosure performs calculations according to the statistical characteristics (that is, the average value and the standard deviation) of the approximate normal distribution of the seed coat color of the green coffee bean, without an additional calculation process for data preprocessing from the image of the green coffee bean.

DETAILED DESCRIPTION OF DISCLOSED EMBODIMENTS

Figure 1:
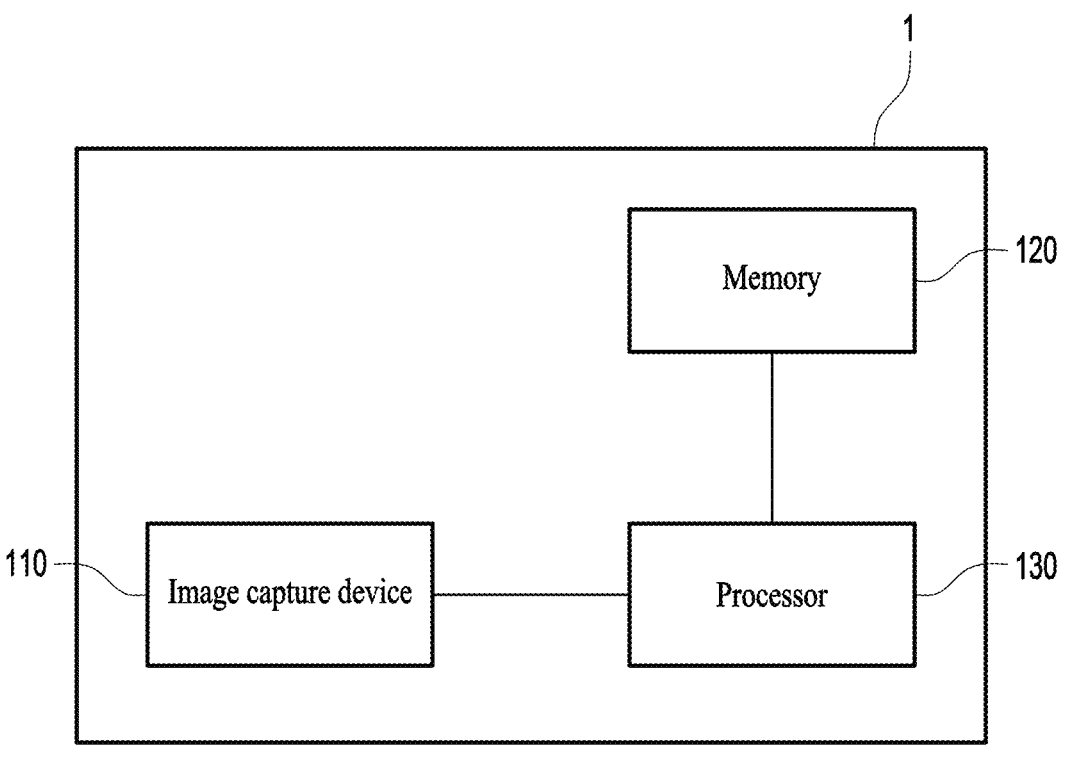
FIG. 1 is a block diagram of a green coffee bean identification method according to an embodiment of the disclosure.

Some exemplary embodiments of the disclosure will be described in detail with reference to the drawings. For the reference numerals cited in the following description, when the same reference numerals appear in different drawings, the reference numerals will be regarded as referring to the same or similar elements. The exemplary embodiments are only a part of the disclosure and do not disclose all possible implementations of the disclosure. More specifically, the exemplary embodiments are merely examples of a method, a device, and a system within the claims of the disclosure.

FIG. 1 is a block diagram of a green coffee bean identification system according to an embodiment of the disclosure. Firstly, FIG. 1 introduces various components and configuration relationships of a green coffee bean identification system 1, and the detailed functions will be disclosed together with the flowcharts of subsequent embodiments.

Please refer to FIG. 1. The green coffee bean identification system 1 of the disclosure includes an image capture device 110, a memory 120, and a processor 130. The processor 130 may be connected to the image capture device 110 and the memory 120 through wireless, wired, or electrical connection.

The image capture device 110 is configured to obtain an image of a green coffee bean. In practice, the image capture device 110 includes an RGB image sensing module. The image of each green coffee bean is composed of pixels, and each pixel is assigned a red color component R, a green color component G, and a blue color component B where the values R, G, and B indicate the intensity of red, green, and blue, respectively, needed to render the pixel of the image. The values R, G, and B are integers ranging from 0 to 255-0 indicates black, and 255 means white.

The memory 120 is configured to store data required for the processor 130 to perform calculations. In the embodiment of the disclosure, the memory 120 is configured to store an average value weight, a standard deviation weight, and a threshold value corresponding to the green coffee bean to be provided to the processor 130 for green coffee bean identification. Practically speaking, the memory 120 may provide any type of memory medium for storing data or programs, such as any type of fixed or removable random access memory (RAM), read-only memory (ROM), flash memory, hard disk, other similar devices, integrated circuits, and a combination thereof.

The processor 130 is configured to control the action of the green coffee bean identification method 1. Practically speaking, the processor 130 may, for example, be a central processing unit (CPU), an application processor (AP), other programmable general-purpose or specific-purpose microprocessors, digital signal processors (DSP), image signal processors (ISP), graphics processing units (GPU), other similar devices, integrated circuits, and a combination thereof.

Figure 2A:
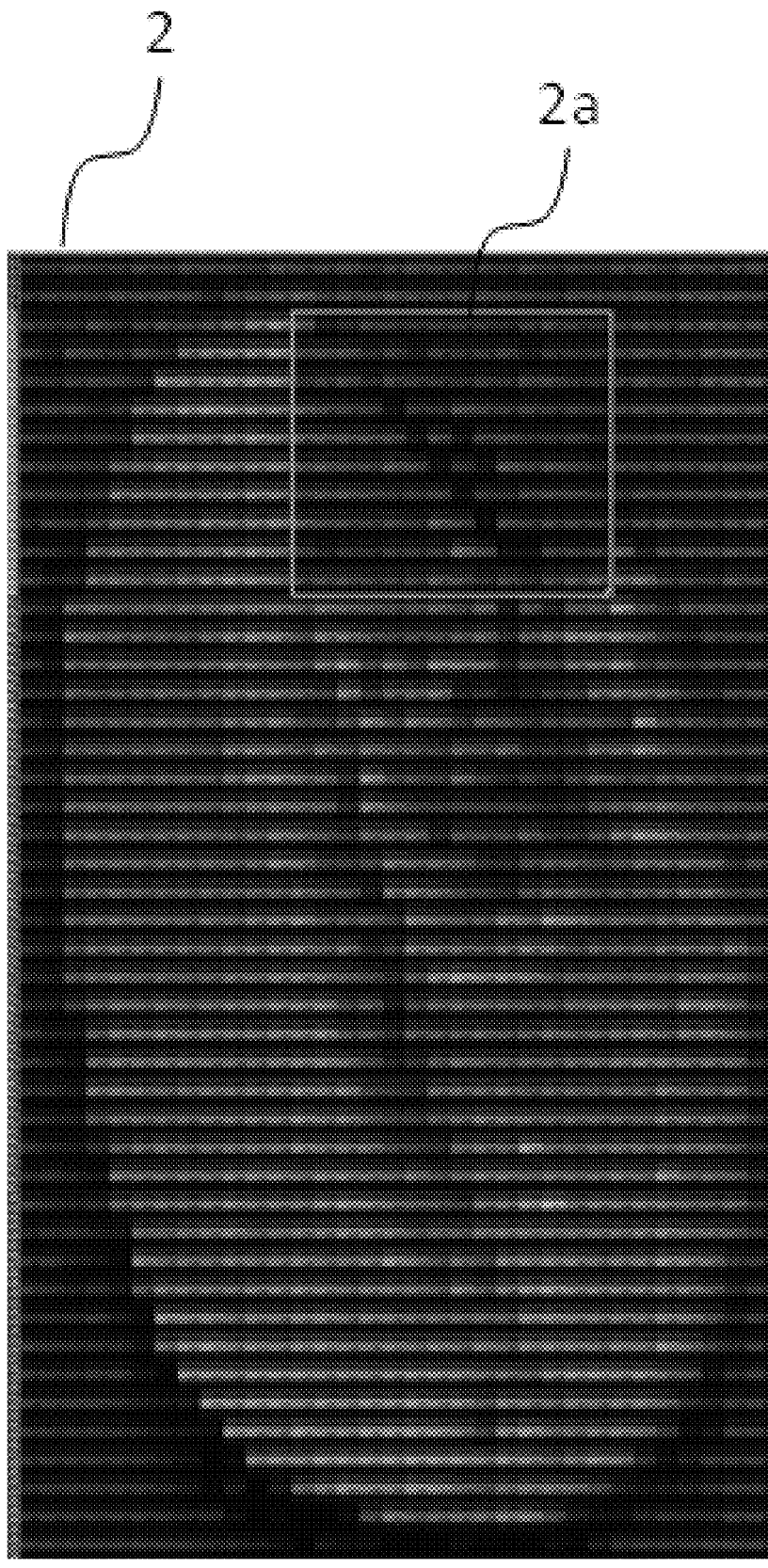
FIG. 2A is an image of a green coffee bean according to an embodiment of the disclosure.

FIG. 2A is a green coffee bean image 2 according to an embodiment of the disclosure. Please refer to FIG. 2A. The green coffee bean image 2 in FIG. 2A is an image obtained through the image capture device 110 for a single green coffee bean. As mentioned above, each green coffee bean image 2 is composed of pixels. For example, the green coffee bean image 2 in FIG. 2A has a total of 2500 pixels (50×50), and each pixel is assigned a vector composed of three grayscale values representing the red component (R), the green component (G), and the blue component (B), respectively. In order to facilitate displaying the three grayscale values of R, G, and B associated with each pixel in the green coffee bean image 2, each pixel in FIG. 2A is divided into three subpixels rendered by three primary colors with intensity indicated by the values R, G, and B.

In the current green coffee bean identification technology, there is no solution for identifying the green coffee bean based on inherent biological characteristics of the seed coat color of the green coffee bean. In the green coffee bean identification system and method described in the disclosure, calculations are performed based on biological characteristics (that is, an average value and a standard deviation) of the seed coat color of the green coffee bean, wherein a distribution curve of the biological characteristics of the seed coat color of the green coffee bean is an approximate normal distribution. Therefore, the green coffee bean identification system and method described in the disclosure do not require additional data preprocessing of the image of the green coffee bean.

In the disclosure, the three primary color grayscale value distributions of green coffee beans can be used to distinguish a qualified green coffee bean from a defective green coffee bean. Simply put, firstly, the approximate normal distribution of one of three primary color grayscale value distributions of green coffee beans is obtained (for example, the red grayscale value distribution of a green coffee bean). Then, based on the fact that the normal distribution can be completely determined by its average value and standard deviation, the average value and the standard deviation of the approximate normal distribution of the indicated primary color grayscale value distribution of the green coffee bean can be used as distinguishing characteristics of green coffee beans. Further, the three approximate normal distributions for the three primary color grayscale value distributions of a green coffee bean can be used as refined characteristics of a green coffee bean. Alternatively, the three pairs consisting of the average value and the standard deviation of the approximate normal distribution of each of the three primary color grayscale value distributions of a green coffee bean can be used as the distinguishing characteristics of a green coffee bean.

Figure 2B:
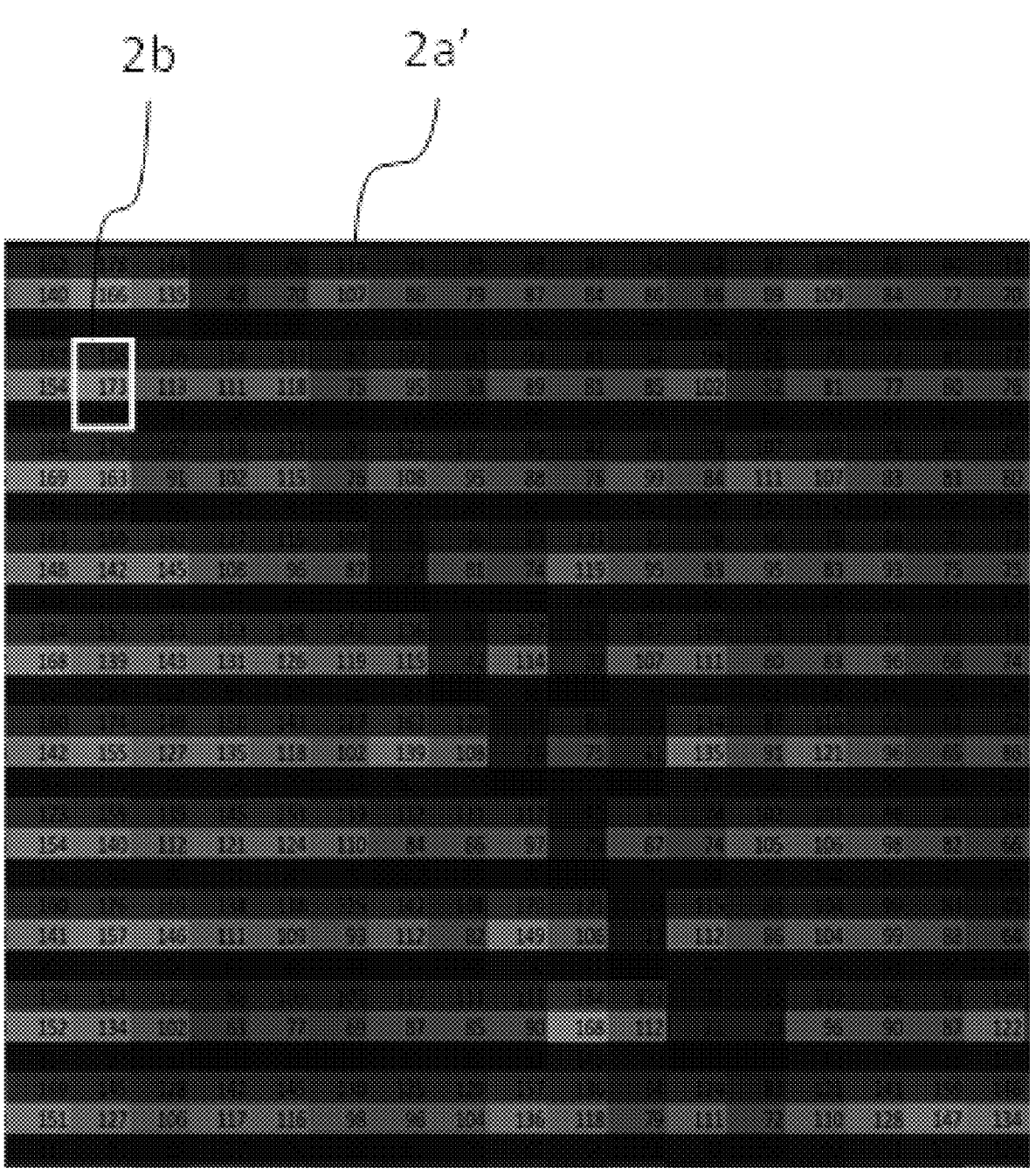
FIG. 2B is an enlarged image for the selected portion of the image of the green coffee bean shown in FIG. 2A.

Next, how the disclosure distinguishes the qualified green coffee bean from the defective green coffee bean using the three primary color distributions of green coffee beans will be described in detail. Firstly, a partially enlarged image 2a is selected from the green coffee bean image 2. FIG. 2B is a partially enlarged image 2a' of the portion 2a of the image of the green coffee bean shown in FIG. 2A. In order to facilitate displaying the three primary color grayscale values, R, G, and B, for each of the pixels in the partially enlarged image 2a' of the green coffee bean, each of the pixels shown in FIG. 2B is rendered using three primary colors with their corresponding (R, G, B) values.

The red grayscale value (R), the green grayscale value (G), and the blue grayscale value (B) for each pixel in the image of a green coffee bean can be seen more clearly from the partially enlarged image 2a' of the green coffee bean. For example, in the pixel 2b of image 2a', the red grayscale value is 186, the green grayscale value is 173, and the blue grayscale value is 154. The associated three primary color grayscale values are also indicated in other pixels of the partially enlarged image 2a'.

With the use of the three primary color grayscale values (R, G, B) for each pixel in the image of a green coffee bean, the histogram of the number of pixels against grayscale values for each primary color channel of the image of a green coffee bean can be constructed. As will be seen later, the statistics characteristics of the histograms above are suitable for identifying a qualified green coffee bean through machine learning algorithm. Details will be described next.

Figure 3:
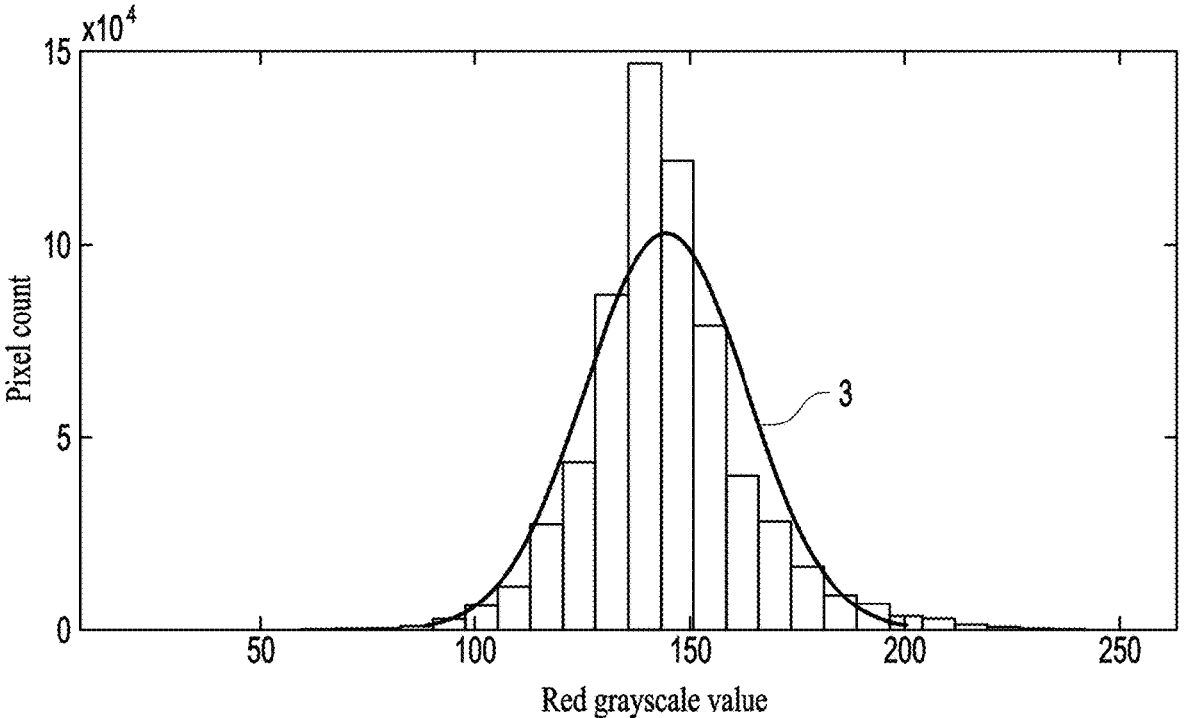
FIG. 3 gives a histogram of the grayscale value distribution showing the frequency of occurrence of each gray-level value found in the red channel of the image of a green coffee bean according to an embodiment of the disclosure. The black solid curve is a fitted normal distribution of the obtained histogram.

FIG. 3 is the histogram of the number of pixels against grayscale values for the red channel of the image of a green coffee bean according to an embodiment of the disclosure. As shown in FIG. 3, the horizontal axis is the red grayscale values ranging from 0 to 255, the vertical axis is the number of pixels corresponding to the red grayscale value, and the curve 3 corresponds to the fitted Gaussian curve. The two histograms associated with the green and blue channels of the image of a green coffee bean are qualitatively similar to that of the red channel. These two histograms are not presented here for the sake of simplicity.

Figure 4A:
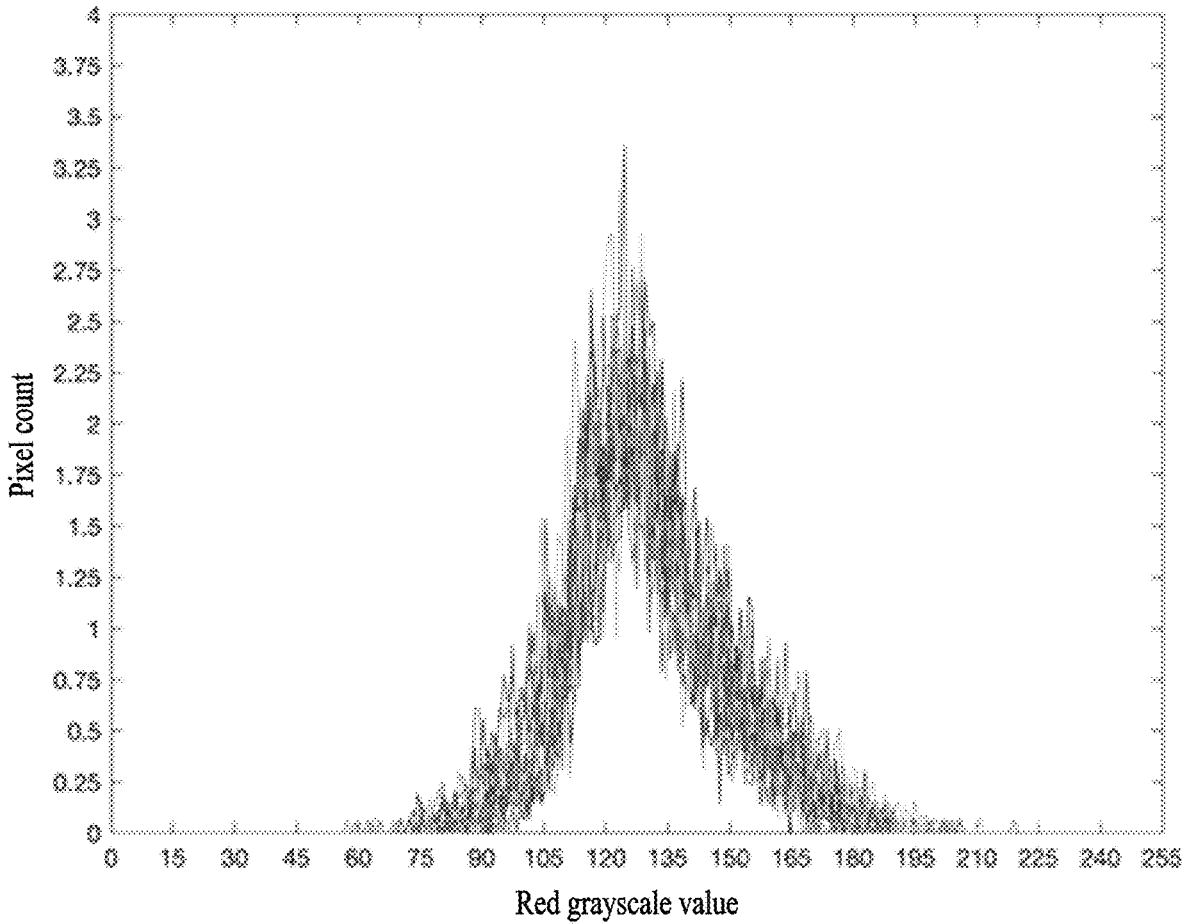
FIG. 4A gives the red grayscale value distribution curves showing the number of pixels at each different gray level value found in the red channel of the image of qualified green coffee beans according to an embodiment of the disclosure. Each curve corresponds to a qualified green coffee bean.

FIG. 4A shows the red grayscale value distribution curve of a qualified green coffee bean according to an embodiment of the disclosure. As shown in FIG. 4A, the horizontal axis is the red grayscale value ranging from 0 to 255, while the vertical axis is the number of pixels corresponding to the red grayscale value. Also, note that different distribution curves (depicted in different colors) correspond to different qualified green coffee beans. It can be observed from FIG. 4A that the red grayscale value distributions of qualified green coffee beans have a high degree of similarity. This observation strongly indicates that the red grayscale value distributions of the seed coats of qualified coffee beans (from the same growing sites) should be identical (up to a small fluctuation).

Figure 4B:
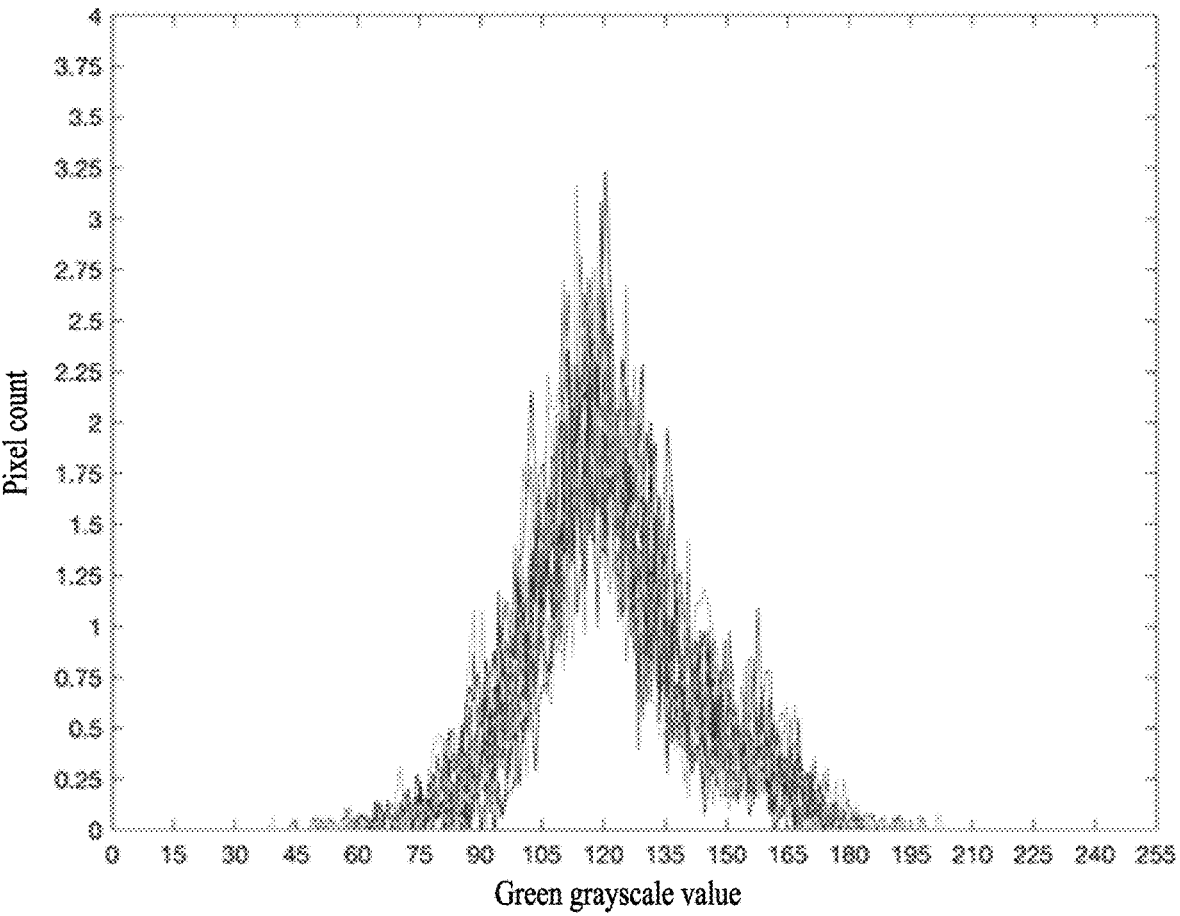
FIG. 4B gives the green grayscale value distribution curves showing the number of pixels at each different gray level value found in the green channel of the image of qualified green coffee beans according to an embodiment of the disclosure. Each curve corresponds to a qualified green coffee bean.
Figure 4C:
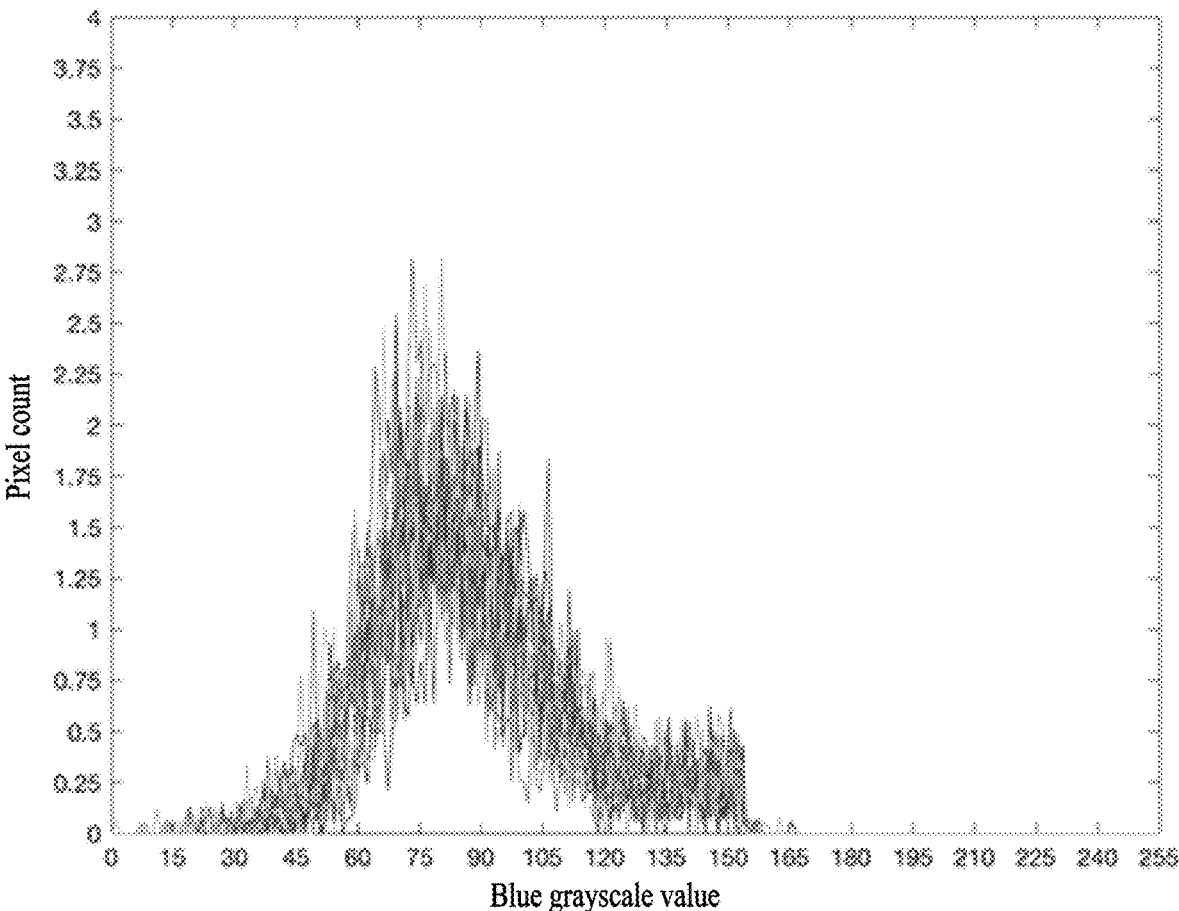
FIG. 4C gives the blue grayscale distribution curves showing the number of pixels at each different gray level value found in the blue channel of the image of qualified green coffee beans according to an embodiment of the disclosure. Each curve corresponds to a qualified green coffee bean.

In addition, according to an embodiment of the disclosure, FIG. 4B shows the green grayscale value distribution of a qualified green coffee bean, while FIG. 4C gives the blue grayscale value distribution of a qualified green coffee bean. As in the case of the red channel, the distribution curves shown in FIG. 4B (respectively FIG. 4C) indicate that the green (respectively blue) grayscale value distributions of the seed coat of qualified coffee beans (from the same growing sites) should be identical (up to a small fluctuation).

It is worth mentioning that the three primary color distributions of the seed coat of a green coffee bean are related to the biochemical reaction in seed coat cells during the growth process of qualified green coffee beans. Therefore, it is expected that any qualified green coffee beans from the same growing sites should share the same primary color distribution of the image of their seed coats.

Figure 5A:
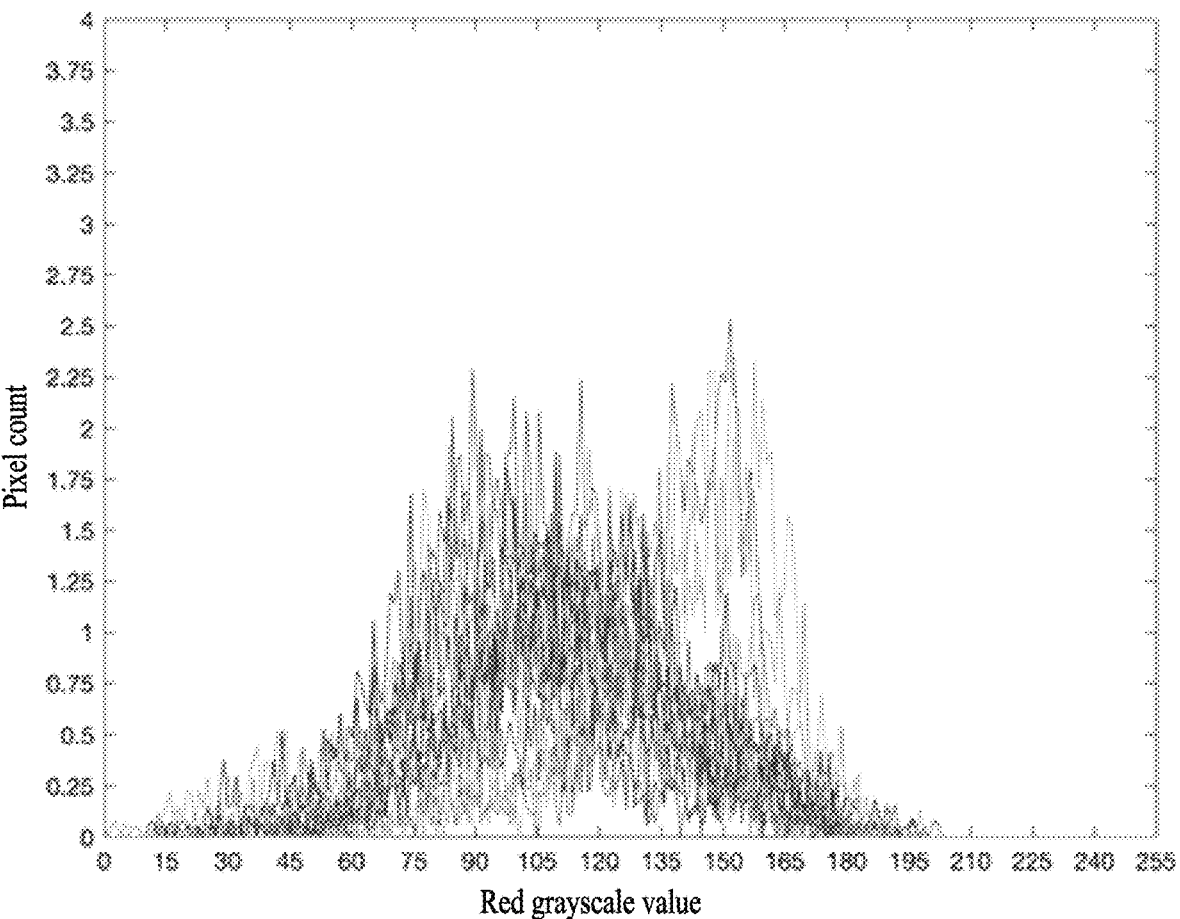
FIG. 5A gives the red grayscale value distribution curves showing the number of pixels at each different gray level value found in the red channel of the image of defective green coffee beans according to an embodiment of the disclosure. Each curve corresponds to a defective green coffee bean.

FIG. 5A shows the red grayscale value distribution of a defective green coffee bean according to an embodiment of the disclosure. As shown in FIG. 5A, the horizontal axis is the red grayscale value ranging from 0 to 255, while the vertical axis is the number of pixels corresponding to the red grayscale value. Also, note that different distribution curves (depicted in different colors) correspond to different defective green coffee beans.

It can be observed from FIG. 5A that there are significant differences between the red grayscale value distribution curves of different defective green coffee beans, and thus the degree of similarity of the red grayscale value distribution curves is lower than that of the red grayscale value distribution curves corresponding to the qualified green coffee bean. Defects of the defective green coffee beans are not only due to breakage during the artificial production process, but also factors such as insect bites and bacterial infections, which affect the biochemical reaction of the seed coat cells and thus cause variation of the seed coat color. Therefore, the red grayscale value distribution of the seed coat color corresponding to the defective green coffee bean deviates from the consistency.

Figure 5B:
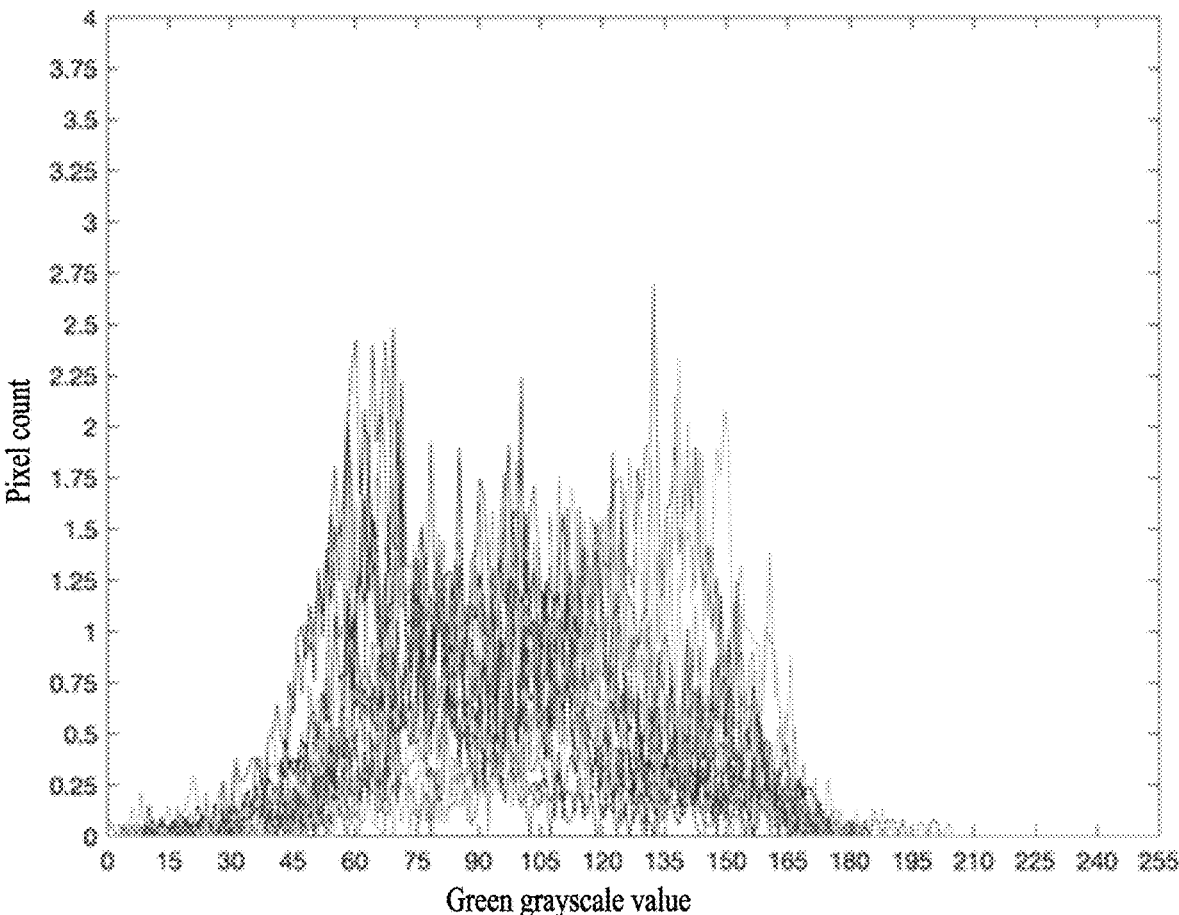
FIG. 5B gives the green grayscale value distribution curves showing the number of pixels at each different gray level value found in the green channel of the image of defective green coffee beans according to an embodiment of the disclosure. Each curve corresponds to a defective green coffee bean.
Figure 5C:
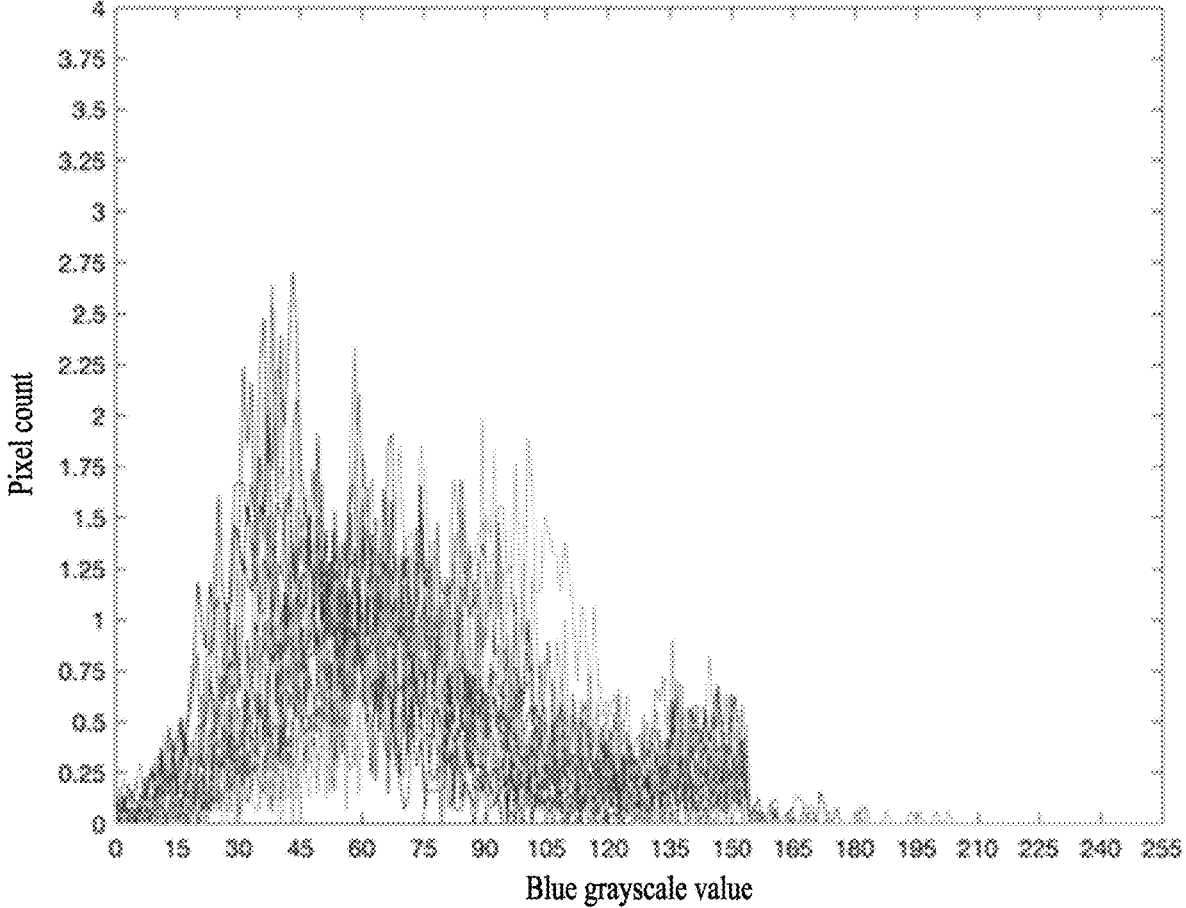
FIG. 5C gives the blue grayscale value distribution curves showing the number of pixels at each different gray level value found in the blue channel of the image of defective green coffee beans according to an embodiment of the disclosure. Each curve corresponds to a defective green coffee bean.

In addition, according to an embodiment of the disclosure, FIG. 5B shows the green grayscale value distribution curve of a defective green coffee bean, while FIG. 5C gives the blue grayscale value distribution curve of a defective green coffee bean. As in the case of the red channel, the distribution curves shown in FIG. 5B and FIG. 5C indicate that there are significant differences between the green (respectively blue) grayscale value distribution curves of the seed coats of different defective coffee beans. Moreover, for defective green coffee beans, the degree of similarity of the corresponding green (respectively blue) grayscale value distribution curves is lower than that of the green (respectively blue) grayscale value distribution curves corresponding to qualified green coffee beans.

In summary, the disclosure can distinguish the qualified green coffee bean from the defective green coffee bean using their primary color grayscale value distribution, a graph showing the number of pixels at each different gray level value found in the primary color channel of the image of a green coffee bean. Precisely, the average values and the standard deviations of the approximate normal distributions of the primary color grayscale value distributions of green coffee beans can be used as the distinguishing characteristics of qualified green coffee beans. In practice, if the required classification accuracy of green coffee beans is not very high, the average value and the standard deviation of the approximate normal distribution of any one of the three primary color distributions of green coffee beans can be used as the distinguishing characteristics of green coffee beans; and if the required classification accuracy of green coffee beans is very high, all of the average values and the standard deviations of the approximate normal distributions of all of the three primary color distributions of green coffee beans are required as the distinguishing characteristics of the green coffee bean.

Figure 6:
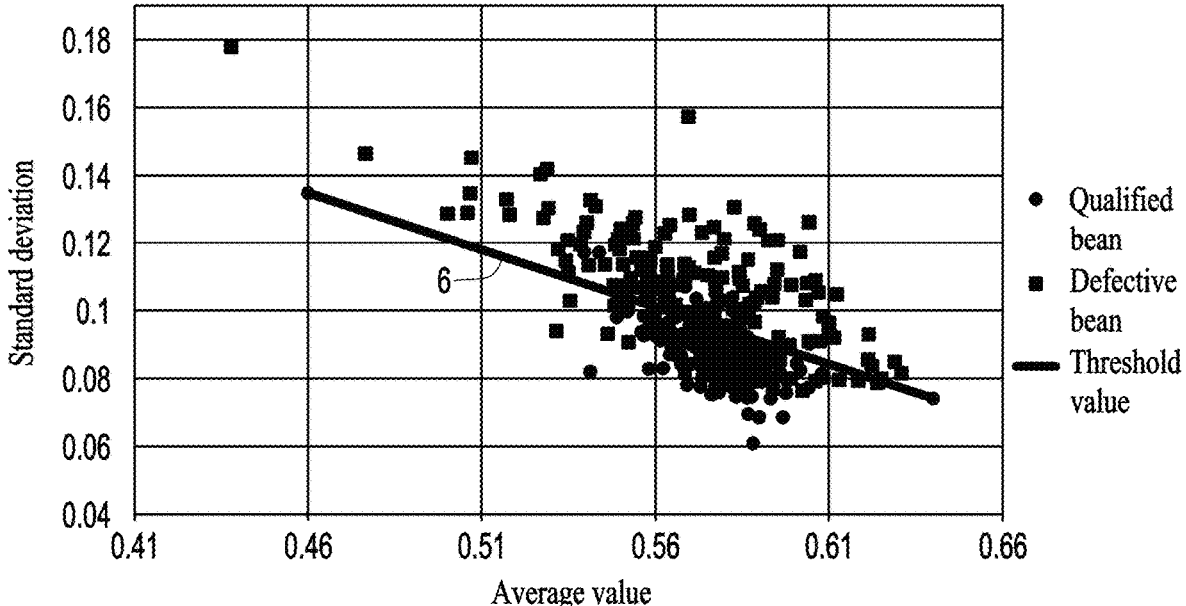
FIG. 6 is a plot of average values against standard deviations of approximate normal distributions of the red grayscale value distribution of green coffee beans in the coordinate plane according to an embodiment of the disclosure. Each point corresponds to a green coffee bean which is either qualified or defective.

FIG. 6 is a graph of the pairs of the average value and standard deviations of the approximate normal distributions of the red grayscale value distribution of green coffee beans in the coordinate plane according to an embodiment of the disclosure. In FIG. 6, the horizontal axis represents the average value, while the vertical axis is the standard deviation. Further, in the coordinate plane shown in FIG. 6, a small dot (respectively a small square) represents the pair of the average value and the standard deviation of the approximate normal distribution of the red grayscale value distribution of a qualified green coffee bean (respectively a defective green coffee bean).

For example, the average values and the standard deviations (denoted as $x_1$ and $y_1$ respectively) of the approximate normal distributions corresponding to the red grayscale value distributions of 30 qualified green coffee beans and 30 defective coffee beans are respectively calculated. Then, each pair of the average value and the standard deviation associated with a qualified green coffee bean (respectively a defective green coffee bean) is depicted as a small dot (respectively a small square) in the coordinate plane.

Roughly speaking, the group of small dots and that of small squares in the coordinate plane can be separated by a separatrix line 6, as shown in FIG. 6. Most of the small dots fall below the separatrix line 6, while most of the small squares fall above the separatrix line 6. In other words, the separatrix line 6 can be used to distinguish the qualified from the defective green coffee beans. Therefore, whether a green coffee bean is a qualified bean can be determined by whether its corresponding pair of the average value and the standard deviation of the approximate normal distribution of the red grayscale value distribution falls below the separatrix line 6. In other words, the separatrix line 6 is a "threshold value" for distinguishing the qualified from the defective green coffee beans.

In an embodiment, the separatrix line 6 can be expressed as the following linear function $f(x_1, y_1)$:

$$f(x_1, y_1) = p_1 x_1 + w_1 y_1 \qquad 5$$

where $x_1$ and $y_1$ are respectively the average value and the standard deviation of the approximate normal distribution of the red grayscale value distribution of the green coffee bean, $p_1$ and $w_1$ are respectively the average value weight and the standard deviation weight corresponding to the origin or the variety of the green coffee bean, and the average value weight $p_1$ and the standard deviation weight $w_1$ are strongly dependent on the origin or the variety of the green coffee bean. In other words, if the origins or the varieties of the green coffee beans are different, then the corresponding average value weights $p_1$ and the standard deviation weights $w_1$ are different.

In an embodiment, after the image capture device 110 obtains an image of a green coffee bean (represented as A) that has not yet been determined to be qualified or defective, the processor 130 receives the image of the green coffee bean A, and reads the average value weight $p_1$, the standard deviation weight $w_1$, and a first threshold value $b_1$ corresponding to the green coffee bean A according to the origin or the variety of the green coffee bean A from the memory 120. The user who intends to identify the green coffee bean A must first know the origin or the variety of the green coffee bean A. By inputting through an input interface (not shown) of the green coffee bean identification system described in the disclosure, the processor 130 can read the average value weight $p_1$, the standard deviation weight $w_1$, and the first threshold value by corresponding to the green coffee bean A from the memory 120 accordingly.

Next, the processor 130 extracts the red grayscale value of each pixel from the image of the green coffee bean A, and calculates the average value $x_1$ and the standard deviation $y_1$ of the approximate normal distribution of the red grayscale value distribution corresponding to the green coffee bean A. After calculating the average value $x_1$ and the standard deviation $y_1$ corresponding to the green coffee bean A, the processor 130 respectively multiplies the average value $x_1$ and the standard deviation $y_1$ by the average value weight $p_1$ and the standard deviation weight $w_1$ to be then added together to calculate a scoring value $B_1$. In detail, the processor 130 can substitute the average value $x_1$ and the standard deviation $y_1$ corresponding to the green coffee bean A calculated by the processor 130 and the average value weight $p_1$ and the standard deviation weight $w_1$ corresponding to the green coffee bean A read from the memory 120 into the linear function $f(x_1, y_1)$ accordingly to calculate the scoring value $B_1$ of the green coffee bean A, that is, the linear function $f(x_1, y_1) = p_1 x_1 + w_1 y_1 =$ the scoring value $B_1$.

If the scoring value $B_1 \leq$ the first threshold value $b_1$, the processor 130 identifies the green coffee bean as a qualified bean. Conversely, if the scoring value $B_1 >$ the first threshold value $b_1$, the processor 130 identifies the green coffee bean as a defective bean.

In order to obtain a better classification results, the red grayscale value distribution, the green grayscale value distribution, and the blue grayscale value distribution of green coffee beans must be taken simultaneously. In another embodiment, the separatrix line 6 shown in FIG. 6 can be expressed as a linear function $F(x_1, y_1, x_2, y_2, x_3, y_3)$ in a six-dimensional space:

$$F(x_1, y_1, x_2, y_2, x_3, y_3) = p_1 x_1 + w_1 y_1 + p_2 x_2 + w_2 y_2 + p_3 x_3 + w_3 y_3$$

where $x_1$ and $y_1$ are the average value and the standard deviation of the approximate normal distribution of the red grayscale value distribution corresponding to the green coffee bean; $x_2$ and $y_2$ are respectively the average value and the standard deviation of the approximate normal distribution of the green grayscale value distribution corresponding to the green coffee bean; $x_3$ and $y_3$ are respectively the average value and the standard deviation of the approximate normal distribution of the blue grayscale value distribution corresponding to the green coffee bean; $p_1$ and $w_1$ are respectively the red average value weight and the red standard deviation weight corresponding to the origin or the variety of the green coffee bean; $p_2$ and we are respectively the green average value weight and the green standard deviation weight corresponding to the origin or the variety of the green coffee bean; and $p_3$ and $w_3$ are respectively the blue average value weight and the blue standard deviation weight corresponding to the origin or the variety of the green coffee bean, wherein the average value weights $p_1$, $p_2$, and $p_3$ and the standard deviation weights $w_1$, $w_2$, and $w_3$ are strongly dependent on the origins or the varieties of the green coffee beans. In other words, if the origins or the varieties of different coffee beans are different, the corresponding average value weights $p_1$, $p_2$, and $p_3$ and the standard deviation weights $w_1$, $w_2$, and $w_3$ are different.

In an embodiment, after the image capture device 110 obtains an image of a green coffee bean (represented as A) that has not yet been determined to be qualified or defective, the processor 130 receives the image of the green coffee bean A, and reads the average value weights $p_1$, $p_2$, and $p_3$, the standard deviation weights $w_1$, $w_2$, and $w_3$, and a second threshold value $b_2$ corresponding to the green coffee bean A from the memory 120 according to the origin or the variety of the green coffee bean A. The user who intends to identify the green coffee bean A must first know the origin or the variety of the green coffee bean A. By inputting through an input interface (not shown) of the green coffee bean identification system described in the disclosure, the processor 130 can read the average value weights $p_1$, $p_2$, and $p_3$, the standard deviation weights $w_1$, $w_2$, and $w_3$, and the second threshold value $b_2$ corresponding to the green coffee bean A from the memory 120 accordingly.

Next, the processor 130 extracts the three primary color grayscale values of each of the pixels from the image of the green coffee bean A, and calculates the average values $x_1$, $x_2$, and $x_3$ and the standard deviations $y_1$, $y_2$, and $y_3$ corresponding to the three approximate normal distributions of all the three primary color grayscale value distributions of the green coffee bean A. After calculating the average values $x_1$, $x_2$, and $x_3$ and the standard deviations $y_1$, $y_2$, and $y_3$ corresponding to the green coffee bean A, the processor 130 respectively multiplies the average values $x_1$, $x_2$, and $x_3$ and the standard deviations $y_1$, $y_2$, and $y_3$ by the average value weights $p_1$, $p_2$, and $p_3$ and the standard deviation weights $w_1$, $w_2$, and $w_3$ to be then added together to calculate scoring values $B_1$, $B_2$, and $B_3$, and then calculate a total scoring value $B_4$ of the sum of the scoring values $B_1$, $B_2$, and $B_3$. In detail, the processor 130 can substitute the average values $x_1$, $x_2$, and $x_3$ and the standard deviations $y_1$, $y_2$, and $y_3$ corresponding to the green coffee bean A calculated by the processor 130 and the average value weights $p_1$, $p_2$, and $p_3$ and the standard deviation weights $w_1$, $w_2$, and $w_3$ corresponding to the green coffee bean A read from the memory 120 into the linear function $F(x_1, y_1, x_2, y_2, x_3, y_3)$ accordingly to calculate the total scoring value $B_4$ of the green coffee bean A, that is, the linear function $F(x_1, y_1, x_2, y_2, x_3, y_3) = p_1x_1 + w_1y_1 + p_2x_2 + w_2y_2 + p_3x_3 + w_3y_3 =$ the total scoring value $B_4$.

If the total scoring value $B_4 \le$ the second threshold value $b_2$, the processor 130 identifies the green coffee bean as a qualified bean. Conversely, if the total scoring value $B_4 >$ the second threshold value $b_2$, the processor 130 identifies the green coffee bean as a defective bean.

In the technology of the disclosure, the average value weights $p_1$, $p_2$, and $p_3$, the standard deviation weights $w_1$, $w_2$, and $w_3$, the first threshold value $b_1$, and the second threshold value $b_2$ are all obtained in advance by applying the machine learning algorithm (e.g., support vector machine) to a training set consisting of green coffee beans which are from the same origin or the same variety, and already identified as qualified or defective, and are stored in the memory 120. The memory 120 described in the disclosure can store multiple sets of the average value weights $p_1$, $p_2$, and $p_3$, the standard deviation weights $w_1$, $w_2$, and $w_3$, and multiple sets of the average value weights $p_1$, $p_2$, and $p_3$, the standard deviation weights $w_1$, $w_2$, and $w_3$, the first threshold value $b_1$, and the second threshold value $b_2$ corresponding to the green coffee beans from different origins or varieties.

It is worth mentioning that in the technology of the disclosure, if the required accuracy is not very strict, whether the green coffee bean is a qualified bean or a defective bean can be effectively identified by the separatrix line 6 corresponding to the linear function $f(x_1, y_1)$ of two variables (that is, the average value and the standard deviation of the approximate normal distribution of the red grayscale value distribution) associated with the image of the seed coat of the green coffee bean. If the required accuracy is high, whether the green coffee bean is a qualified bean or a defective bean is effectively identified by the linear function $F(x_1, y_1, x_2, y_2, x_3, y_3)$ of six variables (that is, the average values and the standard deviations of the approximate normal distributions of all of the three primary color grayscale value distributions) associated with the seed coat of the green coffee bean. Further, compared with the existing classification methods for green coffee beans, the disclosure only use at most six statistics characteristics of green coffee beans which seems to be intrinsic features of qualified green coffee beans, and thus the size of the training set for defining the average value weights ($p_1$, $p_2$, and $p_3$) and the standard deviation weights ($w_1$, $w_2$, and $w_3$) can be small. Therefore, the disclosure not only has a fast identification speed, but also has high identification accuracy.

Figure 7:
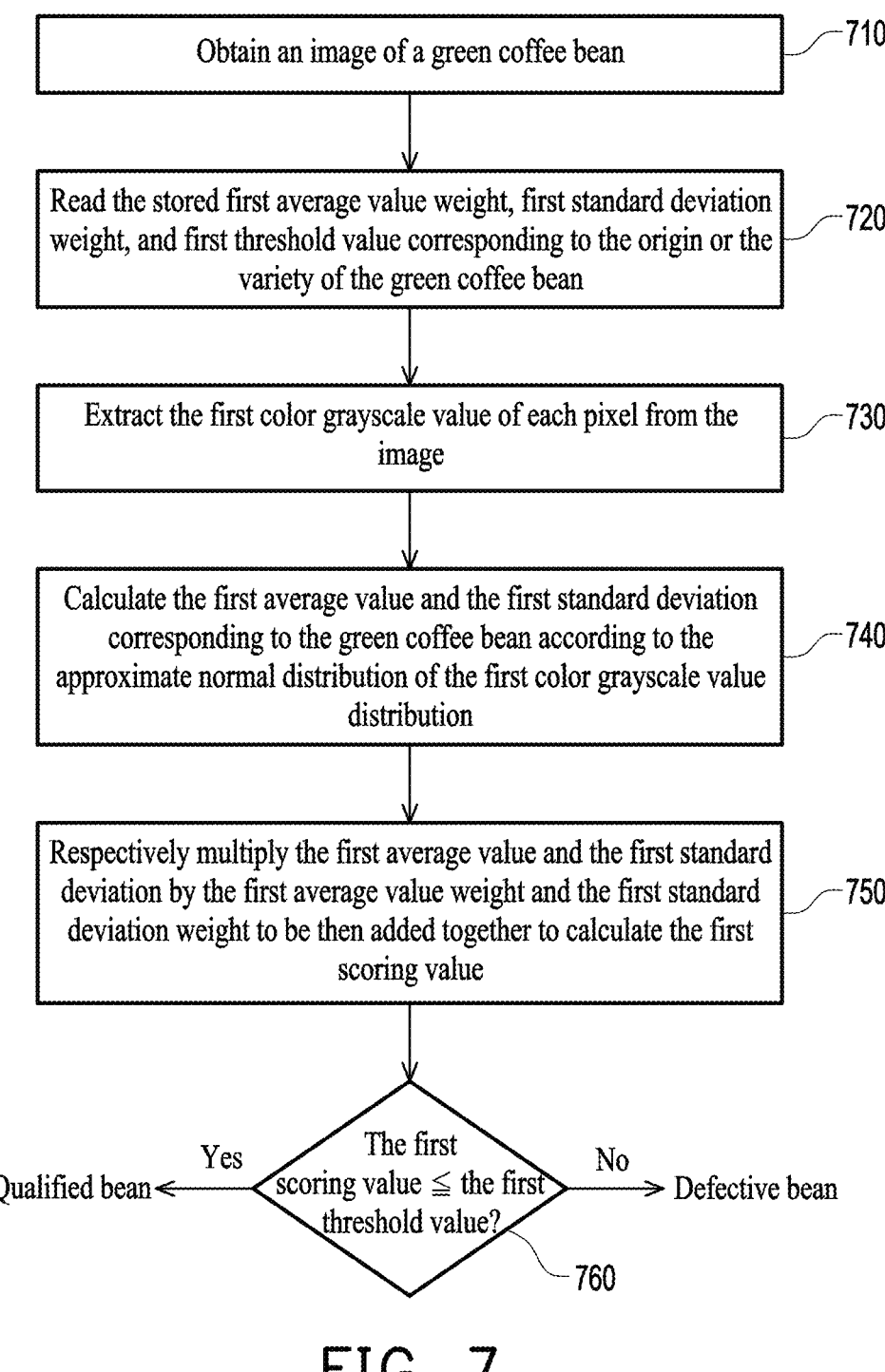
FIG. 7 is a flowchart of a green coffee bean identification method according to an embodiment of the disclosure.

FIG. 7 is a flowchart of a green coffee bean identification method 7 according to an embodiment of the disclosure. The flow of the green coffee bean identification method 7 of FIG. 7 can be implemented by the processor 130 of the green coffee bean identification system 1 of FIG. 1. Next, please refer to FIGS. 1 and 7 simultaneously, and the description of Steps 710 to 760 of the green coffee bean identification method 7 considers only the first color grayscale value distribution of the green coffee bean A.

In Step 710, an image of a green coffee bean A that has not been determined to be qualified or defective is obtained by the image capture device 110, wherein the image of the green coffee bean A includes multiple pixels. In Step 720, the average value weight $p_1$, the standard deviation weight $w_1$, and the first threshold value by corresponding to the green coffee bean A are read from the memory 120. In an embodiment, the average value weight $p_1$, the standard deviation weight $w_1$, and the first threshold value $b_1$ are obtained in advance by applying the machine learning algorithm (e.g., support vector machine) to a training set consisting of green coffee beans which are from the same origin or the same variety, and already identified as qualified or defective. The green coffee bean identification method 7 described in the disclosure can have multiple sets of the average value weight $p_1$, the standard deviation weight $w_1$, and the first threshold value $b_1$, and multiple sets of the average value weight $p_1$, the standard deviation weight $w_1$, and the first threshold value $b_1$ corresponding to green coffee beans from different origins or varieties.

In Step 730, the first color grayscale value for each of all the pixels is extracted from the image of the green coffee bean A. In Step 740, the average value x and the standard deviation y corresponding to the first color channel of the green coffee bean A are calculated according to the approximate normal distribution of the first color grayscale value distribution. In Step 750, the average value $x_1$ and the standard deviation $y_1$ are respectively multiplied by the average value weight $p_1$ and the standard deviation weight $w_1$ to be then added together to calculate the scoring value $B_1$. In detail, the processor 130 can substitute the calculated average value $x_1$ and standard deviation $y_1$ corresponding to the green coffee bean A and the average value weight $p_1$ and the standard deviation weight $w_1$ corresponding to the green coffee bean A read from the memory 120 into the linear function $f(x_1, y_1)$ accordingly to calculate the scoring value $B_1$ of the coffee green coffee bean A, that is, the linear function $f(x_1, y_1) = p_1x_1 + w_1y_1 =$ the scoring value $B_1$.

Figure 8:
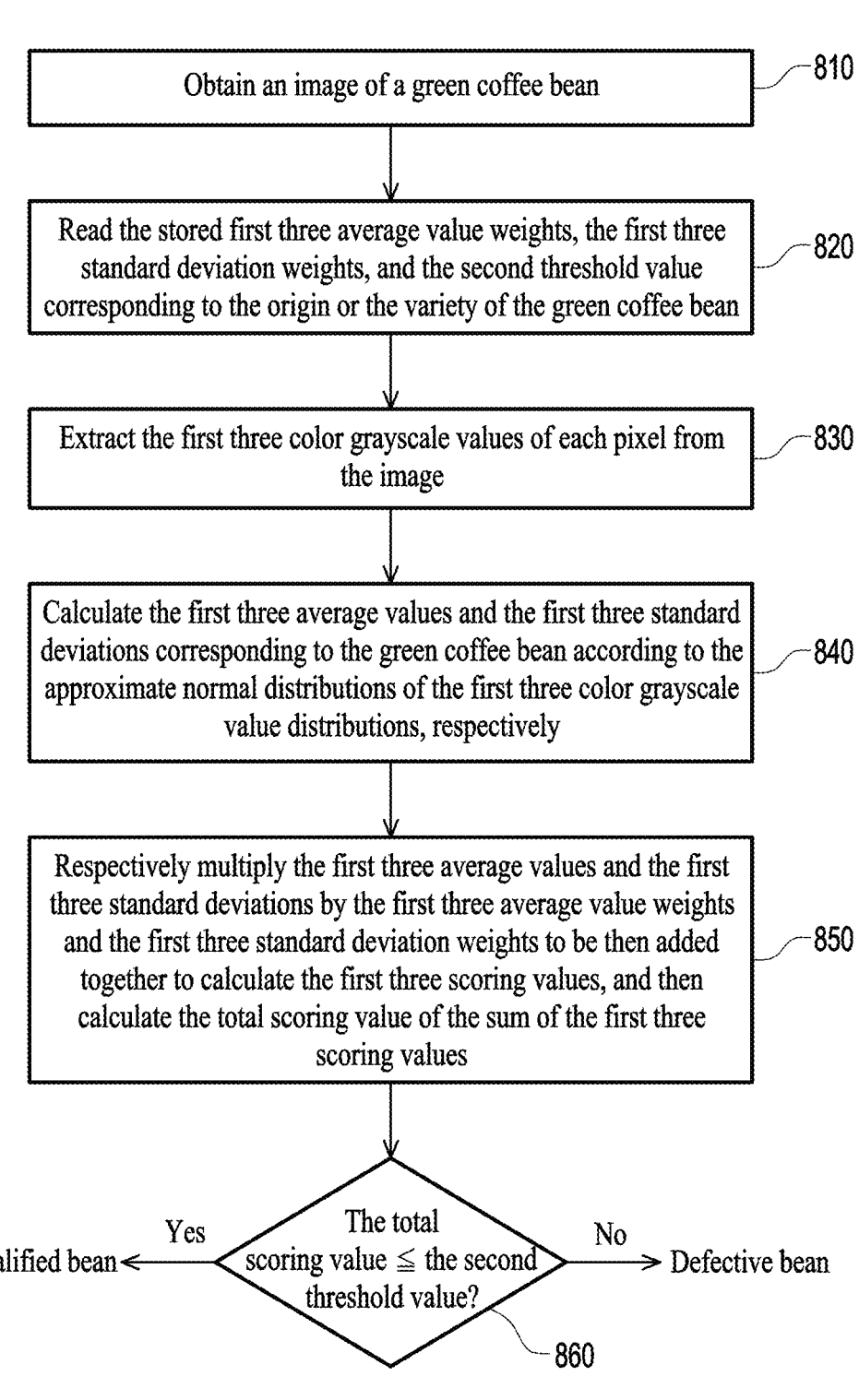
FIG. 8 is a flowchart of a green coffee bean identification method according to another embodiment of the disclosure.

In Step 760, it is judged whether the scoring value By is less than or equal to the first threshold value $b_1$. If the scoring value $B_1 \le$ the first threshold value $b_1$, the processor 130 identifies the green coffee bean as a qualified bean. Conversely, if the scoring value $B_1 >$ the first threshold value $b_1$, the processor 130 identifies the green coffee bean as a defective bean. In order to obtain a better classification effect, the red grayscale value, the green grayscale value, and the blue grayscale value distributions of green coffee beans must be considered simultaneously. FIG. 8 is a flowchart of a green coffee bean identification method 8 according to another embodiment of the disclosure. The flow of the green coffee bean identification method 8 of FIG. 8 can be implemented by the processor 130 of the green coffee bean identification system 1 of FIG. 1. Next, please refer to FIGS. 1 and 8 simultaneously, and the description of Steps 810 to 860 of the green coffee bean identification method 8 considers all of the three primary color grayscale distributions of the green coffee bean A.

In Step 810, an image of a green coffee bean A that has not been determined to be qualified or defective is obtained by the image capture device 110, wherein the image of the green coffee bean A includes multiple pixels. In Step 820, the stored average value weights $p_1$, $p_2$, and $p_3$, the standard deviation weights $w_1$, $w_2$, and $w_3$, and the second threshold value $b_2$ corresponding to the origin or the variety of the green coffee bean A are read from the memory 120. In an embodiment, the average value weights $p_1$, $p_2$, and $p_3$, the standard deviation weights $w_1$, $w_2$, and $w_3$, and the second threshold value $b_2$ are obtained in advance by applying the machine learning algorithm (e.g., support vector machine) to a training set consisting of green coffee beans which are from the same origin or the same variety, and already identified as qualified or defective, and are stored in the memory 120. The green coffee bean identification method 8 described in the disclosure can have multiple sets of the average value weights $p_1$, $p_2$, and $p_3$, multiple sets of the standard deviation weights $w_1$, $w_2$, and $w_3$, and multiple sets of the second threshold value $b_2$, corresponding to green coffee beans from different origins or varieties, and the sets of the average value weights $p_1$, $p_2$, and $p_3$, the standard deviation weights $w_1$, $w_2$, and $w_3$.

In Step 830, the three primary color grayscale values of each the pixels are extracted from the image of the green coffee bean A. In Step 840, the average values $x_1$, $x_2$, and $x_3$ and the standard deviations $y_1$, $y_2$, and $y_3$ corresponding to the three primary color grayscale value distributions of the green coffee bean A are calculated according to the approximate normal distributions of the three primary color grayscale value distributions of beans. In Step 850, the average values $x_1$, $x_2$, and $x_3$ and the standard deviations $y_1$, $y_2$, and $y_3$ are respectively multiplied by the average value weights $p_1$, $p_2$, and $p_3$ and the standard deviation weights $w_1$, $w_2$, and $w_3$, to be then added together to calculate the scoring values $B_1$, $B_2$, and $B_3$, and then calculate the total scoring value $B_4$ of the sum of the scoring values $B_1$, $B_2$, and $B_3$. In detail, the processor 130 can substitute the calculated average values $x_1$, $x_2$, and $x_3$ and the standard deviations $y_1$, $y_2$, and $y_3$, corresponding to the green coffee bean A, and the average value weights $p_1$, $p_2$, and $p_3$ and the standard deviation weights $w_1$, $w_2$, and $w_3$, corresponding to the origin or the variety of the green coffee bean A read from the memory 120, into the linear function $F(x_1, y_1, x_2, y_2, x_3, y_3)$ to calculate the total scoring value $B_4$ of the green coffee bean A, that is, the linear function $F(x_1, y_1, x_2, y_2, x_3, y_3)=p_1x_1+w_1y_1+p_2x_2+w_2y_2+p_3x_3+w_3y_3=$the total scoring value $B_4$.

In Step 860, it is judged whether the total scoring value $B_4$ is less than or equal to the second threshold value $b_2$. If the total scoring value $B_4 \leq$ the second threshold value $b_2$, the processor 130 identifies the green coffee bean as a qualified bean. Conversely, if the total scoring value $B_4 >$ the second threshold value $b_2$, the processor 130 identifies the green coffee bean as a defective bean.

In summary, the green coffee bean identification system and the green coffee bean identification method described in the embodiments of the disclosure can perform identification with the low-resolution image of the green coffee bean, so the identification process can be performed in conjunction with low-cost Raspberry Pi and Arduino hardware architectures. In addition, note that the technology of the disclosure can effectively identify the green coffee bean as a qualified bean or a defective bean by relying only on the six characteristics (that is, the average values and the standard deviations of the approximate normal distributions of the three primary color grayscale value distributions) corresponding to the image of the seed coat of the green coffee bean.

Therefore, compared with the existing classification methods for green coffee beans, the disclosure only use at most six statistics characteristics of green coffee beans which seems to be intrinsic features of qualified green coffee beans, and thus the size of the training set for defining the average value weights ($p_1$, $p_2$, and $p_3$) and the standard deviation weights ($w_1$, $w_2$, and $w_3$) can be small. Therefore, the disclosure not only has a fast identification speed, but also has high identification accuracy.

What is claimed is:

1. A green coffee bean identification system, comprising:
   an image capture device, configured to obtain an image of a green coffee bean, wherein the image comprises a plurality of pixels;
   a memory, configured to store a first average value weight, a first standard deviation weight, and a first threshold value corresponding to the green coffee bean;
   a processor, coupled to the image capture device and the memory, and configured to execute:
   receiving the image, and reading the first average value weight, the first standard deviation weight, and the first threshold value;
   extracting a first color grayscale value for each of the pixels from the image;
   calculating a first average value and a first standard deviation corresponding to the green coffee bean according to an approximate normal distribution of the extracted first color grayscale values; and
   calculating a first scoring value by summing a product of the first average value and the first average value weight, and a product of the first standard deviation and the first standard deviation weight,
   wherein when the first scoring value is less than or equal to the first threshold value, the processor identifies the green coffee bean as a qualified bean;
   wherein the first average value weight, the first standard deviation weight, and the first threshold value are obtained by applying a machine learning algorithm to a training set consisting of a plurality of green coffee beans already identified as qualified or defective, wherein the green coffee beans for training are from a same origin or a same variety.

2. The green coffee bean identification system according to claim 1, wherein when the first scoring value is greater than the first threshold value, the processor identifies the green coffee bean as a defective bean.

3. The green coffee bean identification system according to claim 1,
   wherein the memory is further configured to store a second average value weight, a third average value weight, a second standard deviation weight, a third standard deviation weight, and a second threshold value corresponding to the green coffee bean;
   wherein the processor is further configured to execute:
   reading the second average value weight, the third average value weight, the second standard deviation weight, the third standard deviation weight, and the second threshold value;
   extracting a second color grayscale value and a third color grayscale value for each of the pixels from the image;
   calculating a second average value and a second standard deviation corresponding to the green coffee bean according to an approximate normal distribution of the extracted second color grayscale values;
   calculating a third average value and a third standard deviation corresponding to the green coffee bean according to an approximate normal distribution of the extracted third color grayscale values;
   calculating a second scoring value by summing a product of the second average value and the second average value weight, and a product of the second standard deviation and the second standard deviation weight; and
   calculating a third scoring value by summing a product of the third average value and the third average value weight, and a product of the third standard deviation and the third standard deviation weight, wherein when a sum of the first scoring value, the second scoring value, and the third scoring value is less than or equal to the second threshold value, the processor identifies the green coffee bean as a qualified bean.

4. The green coffee bean identification system according to claim 3, wherein when the sum of the first scoring value, the second scoring value, and the third scoring value is greater than the second threshold value, the processor identifies the green coffee bean as a defective bean.

5. The green coffee bean identification system according to claim 3, wherein the first average value weight, the second average value weight, the third average value weight, the first standard deviation weight, the second standard deviation weight, the third standard deviation weight, the first threshold value, and the second threshold value correspond to an origin or a variety of the green coffee bean.

6. The green coffee bean identification system according to claim 5, wherein the second average value weight, the third average value weight, the second standard deviation weight, the third standard deviation weight, and the second threshold value are obtained by applying the machine learning algorithm to the training set consisting of the plurality of green coffee beans already identified as qualified or defective.

7. The green coffee bean identification system according to claim 1, wherein the first color grayscale value is a red grayscale value.

8. The green coffee bean identification system according to claim 1, wherein, for beans from a same origin or a same variety, (i) the distribution of the first color grayscale values associated with qualified beans is substantially consistent, (ii) the distribution of the second color grayscale values associated with qualified beans is substantially consistent, and (iii) the distribution of the third color grayscale values associated with qualified beans is substantially consistent; and wherein, for defective beans from a same origin or a same variety, the corresponding distributions of the first, second, and third color grayscale values are each statistically distinct.

9. A green coffee bean identification method, suitable for a coffee green coffee bean identification device with an image capture device and a memory, the green coffee bean identification method comprising:

obtaining an image of a green coffee bean through an image capture device, wherein the image comprises a plurality of pixels;

reading a first average value weight, a first standard deviation weight, and a first threshold value corresponding to an origin or a variety of the green coffee bean stored in the memory;

extracting a first color grayscale value for each of the pixels from the image;

calculating a first average value and a first standard deviation corresponding to the green coffee bean according to an approximate normal distribution of the extracted first color grayscale values; and calculating a first scoring value by summing a product of the first average value and the first average value weight, and a product of the first standard deviation and the first standard deviation weight, wherein when the first scoring value is less than or equal to the first threshold value, the green coffee bean is identified as a qualified bean;

wherein the first average value weight, the first standard deviation weight, and the first threshold value are obtained by applying a machine learning algorithm to a training set consisting of a plurality of green coffee beans already identified as qualified or defective, wherein the green coffee beans for training are from a same origin or a same variety.

10. The green coffee bean identification method according to claim 9, wherein when the first scoring value is greater than the first threshold value, the green coffee bean is identified as a defective bean.

11. The green coffee bean identification method according to claim 9, further comprising:

reading a second average value weight, a third average value weight, a second standard deviation weight, a third standard deviation weight, and a second threshold value;

extracting a second color grayscale value and a third color grayscale value for each of the pixels from the image;

calculating a second average value and a second standard deviation corresponding to the green coffee bean according to an approximate normal distribution of the extracted second color grayscale values;

calculating a third average value and a third standard deviation corresponding to the green coffee bean according to an approximate normal distribution of the extracted third color grayscale values;

calculating a second scoring value by summing a product of the second average value and the second average value weight, and a product of the second standard deviation and the second standard deviation weight; and calculating a third scoring value by summing a product of the third average value and the third average value weight, and a product of the third standard deviation and the third standard deviation weight, wherein when a sum of the first scoring value, the second scoring value, and the third scoring value is less than or equal to the second threshold value, the processor identifies the green coffee bean as a qualified bean.

12. The green coffee bean identification method according to claim 11, wherein when the sum of the first scoring value, the second scoring value, and the third scoring value is greater than the second threshold value, the processor identifies the green coffee bean as a defective bean.

13. The green coffee bean identification method according to claim 11, wherein the first average value weight, the second average value weight, the third average value weight, the first standard deviation weight, the second standard deviation weight, the third standard deviation weight, the first threshold value, and the second threshold value correspond to an origin or a variety of the green coffee bean.

14. The green coffee bean identification method according to claim 13, wherein the second average value weight, the third average value weight, the second standard deviation weight, the third standard deviation weight, and the second threshold value are obtained by applying the machine learning algorithm to the training set consisting of the plurality of green coffee beans already identified as qualified or defective.

15. The green coffee bean identification method according to claim 9, wherein the first color grayscale value is a red grayscale value.

16. The green coffee bean identification method according to claim 9, wherein, for beans from a same origin or a same variety, (i) the distribution of the first color grayscale values associated with qualified beans is substantially consistent, (ii) the distribution of the second color grayscale values associated with qualified beans is substantially consistent, and (iii) the distribution of the third color grayscale values associated with qualified beans is substantially consistent; and wherein, for defective beans from a same origin or a same variety, the corresponding distributions of the first, second, and third color grayscale values are each statistically distinct.

* * * * *